Patented June 27, 1939

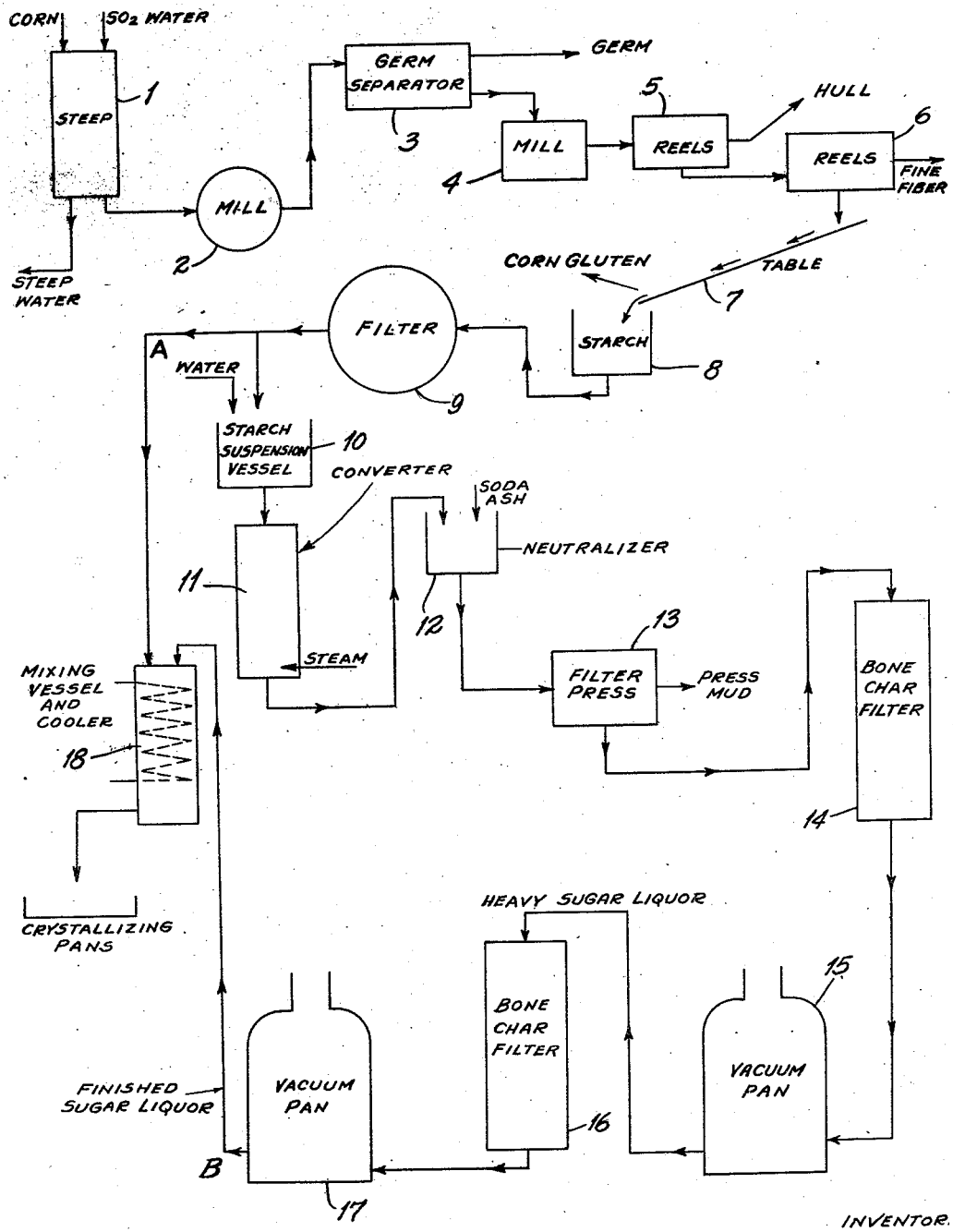

2,163,782

UNITED STATES PATENT OFFICE 2,163,782

COMPOSITION OF MATTER DERIVED FROM STARCH AND THE PROCESS OF MAKING THE SAME

Walter R. Fetzer, Clayton, Mo., assignor to Union Starch and Refining Company, Columbus, Ind., a corporation of Indiana Application June 29, 1936, Serial No. 87,950

10 Claims. (Cl. 127—29)

This invention relates to a new composition of matter derived from starch and the process of making the same.

The new composition of matter of the present invention is particularly useful as a melt adjunct in the process of brewing beer.

Under the present practice in the making of beer, various malt adjuncts are used as diluents of malt to reduce the amount of soluble protein in the brew, thereby decreasing the tendency to form a protein haze in the finished beer, and also to lower the cost of material for making beer. The malt adjunct provides a fermentable substance in addition to the substances present in the malt, and is of a lower cost.

A number of derivative substances from corn are commonly used in the brewing art comprising such products as coarse grits, refined grits, corn syrup or corn sugar. Coarse and refined grits contain starch as a useful malt adjunct. Starch derived from other cereals may be employed. Rice starch in the form of rice grits is commonly used.

The starch constituent in the form of coarse grits has certain desirable attributes for such use, chief of which are its low cost, freedom from dust and its ability to impart to the brew a distinctive flavor because of constituents in the grits other than starch, for example, corn gluten. Coarse grits has, at the same time, certain disadvantages, namely, the difficulty in processing the brew, as this material is difficult to properly cook, requiring usually the use of pressure cookers. Moreover, coarse grits has a corn oil content, which has a tendency to become rancid and frequently this rancidity is carried over into the finished beer. The presence of the corn oil is also likely to impart turbidity to the finished beer and frequently decreases the foam retention of the finished product.

The use of refined grits has certain advantages compared to the coarse grits, namely, it has a higher starch content; it readily resuspends, reducing the difficulties of cooking, and is substantially free from corn oil. It has disadvantages in that it is more dusty and is more costly to produce.

Corn syrup and corn sugar are highly desirable for certain aspects as malt adjuncts. These materials are free from dust and oil and, since they are in a more refined state than either the coarse or refined grits, less kettle capacity is required in the brewing process where these materials are used. The disadvantage resulting from these products as malt adjuncts is their high cost. In the manufacture of these syrup or sugar products from starch, there are a number of steps, such as the acid hydrolysis, filtration, refining, and evaporation which are reflected in the relatively high cost of the products.

It is, therefore, much more economical, from a manufacturing standpoint, in the production of beer to employ starch before it has been converted by hydrolysis to the syrup or sugar. In the process of brewing the malt, starch utilized in the beer batch is similarly hydrolyzed, utilizing the enzymes in the malt for this purpose, and since there is usually an excess of these enzymes, by using starch directly in the manufacture of beer, a substantial saving in some of the conversion, filtering, refining and evaporating costs of corn syrup and corn sugar results. Moreover, a chemical gain results by either the acid or enzyme hydrolysis of the starch, which is not attained when corn syrup or corn sugar is used in the brew.

An object of the present invention is to provide a product and the method of making the same which product may be more advantageously used than any of the commonly used malt adjuncts. For example, the product of the present invention is free from dust that is present in the refined grits; it is free from the corn oil present in the coarse grits, which is often detrimental to beer; at the same time, the product can be made to retain, to a large extent, through proper choice of starch bearing material, all those other ingredients present in coarse grits, and which contribute a distinctive flavor to the brew. It may be readily processed as a component of the beer batch. It likewise may be produced much more economically than the syrup or sugar. It may also be employed more economically in the brewing process, as compared with corn syrup and corn sugar, because of the fact that the chemical gain, resulting from the hydrolysis of the starch contained therein, is obtained.

In order that the process of producing the product of the present invention may be readily understood, reference is made to the accompanying drawing which shows diagrammatically a flow sheet of the process.

The usual process of converting corn into refined grits comprises feeding the corn to a vessel 1 and therein mixing it with a water solution of approximately 0.3% sulfurous acid. In usual practice the corn in the vessel 1 has, when fully soaked or steeped, approximately at 45% moisture content. The wet corn is then passed to a mill 2 the function of which is to crack the grains and to release the germs. The mass is then combined in a vessel or germ separator 3 with water containing free starch in suspension to an adequate density to float the germs from the grain, which germs are then drawn off from the separator. Since the remainder of the corn kernels is heavier than the germs, it settles by gravity and is fed to a mill 4, the function of which is to finely grind the material. The effluent from the grinding mill passes to a series of coarse reels, indicated at 5 in the drawing, the function of which is to remove the hulls. The material then passes to a second series of reels, indicated at 6, equipped with silk bolting cloth, where, in turn, the finer fibrous material is removed from the mass. The material that passes through the bolting cloth comprises a mixture of corn gluten and starch, which is run to a separating table 7, and the gluten is separated from the starch by flotation of the gluten. The starch or starch bearing component is fed to a vessel 8 where it is resuspended in water, and then passes to a filter 9, preferably of the continuous type, where it is dewatered and sometimes spray washed with fresh water. The material after this dewatering and washing step comes from the filters with a moisture content of approximately 45%. Because the material at this moisture content would tend to mold very quickly, it is necessary, in order to make it stable, to artificially dry it, usually in kilns, until the moisture is reduced to approximately 10 to 12%.

This process is known in the art as the wet milling process for producing refined grits. One of the objects of this invention is to utilize this material leaving the wet milling process at A as a component of a product that may be used for a malt adjunct, by reducing its moisture content in a new manner to make it stable and, at the same time, to obtain the advantage of starch for its desirable chemical gain, and also to avoid the expense of artificial drying thereof.

It should not be understood that the present invention is limited to the use of the starch or starch bearing material taken from the wet milling process at point A, as indicated. The starch or starch bearing material may be taken from any point in the wet milling process either prior to or after point indicated by A. It is to be further understood that the present invention is not to be limited to corn starch or corn starch bearing material but is to include starch or starch bearing material from other grains such as rice, wheat, barley and the like, and such plants as sago, potato, tapioca, and the like.

The starch bearing material such as that leaving the wet mill process at A, is combined and treated, as will be hereinafter explained, with a further refined product from the corn sugar conversion process.

In the wet milling process, when the starch bearing material is to be used for the manufacture of other dry starches or is to be used in the manufacture of syrup or sugar, it is further washed or refined. After these additional washing steps, and when intended for the manufacture of corn sugar, the material is passed to a vessel 10, where a sufficient amount of water is added to increase the moisture content resulting in a suspension having a Baumé gravity of approximately 10–24°. The liquid suspension of the starch bearing material is then pumped into a pressure vessel or converter 11, wherein it is treated with acid, preferably hydrochloric, and heated to effect hydrolysis. The hydrolysis is carried out until the reducing sugars, as dextrose, is usually within the range of from approximately 80 to 93% on a dry substance basis. The liquid is then passed to a vessel or neutralizer 12, where it is treated with preferably soda ash to substantially neutralize the acid employed in the hydrolysis step. From the neutralizer, the material passes to a filter press 13 to remove coagulated protein and fat, and the liquor is then treated with decolorizing carbon or in bone char filters or both, indicated at 14, after which it is concentrated in a vacuum pan 15 to approximately 30° Baumé, and has a moisture content of approximately 45%. The liquor may then receive additional decolorization by vegetable carbon and/or treatment in one or more bone char filters, indicated at 16, after which it is heated in a vacuum pan 17 and dewatered to approximately 10% to 18% moisture content, or to a Baumé gravity ranging from approximately 42° to 46°, depending upon the grade of the final sugar product.

In practice, the sugar is of grades known as No. 70 or No. 80, characterized by the percent of reducing sugar as dextrose in the finished product. The moisture content for No. 70 sugar approximates 17% to 19%, and for the No. 80 sugar approximates 10% to 12%.

The material leaving the vacuum pan 17 at B is further processed by running the sugar liquor into tanks known as coolers, where it is cooled and seeded, i. e., sufficient quantity of material from a previous batch undergoing crystallization is added to initiate crystallization and, after crystallization has commenced, it is run into suitable containers where crystallization is completed, producing a sugar of stable solid form, commonly called sugar concrete.

The formation of the sugar concrete results, to a large extent, from the formation of dextrose monohydrate. For example, a unit of anhydrous dextrose will take up approximately 10% by weight of water as water of crystallization. Any water content in excess of the amount required to supply the water of crystallization is occluded water between the dextrose monohydrate crystals.

It has been found that if the sugar liquor leaving the vacuum pan 17 is mixed with the starch bearing material, such as the material leaving the process at A, in suitable proportions and crystallized together, water will be withdrawn from the starch mixture, through the property of the water to form as water of crystallization in proportion to the dextrose present in the mixture, to such a degree that the resulting product is stable. The moisture content is far enough reduced to prevent the formation of mold. The starch component treated in this manner is a less expensive ingredient than refined grits, dry starch or corn sugar. The artificial drying of the starch component is entirely eliminated and the composite mixture has a quality to more rapidly crystallize.

It will be understood that the material leaving the process at A is a material taken from an interrupted wet milling process for the production of refined grits; and that the secondary stage of the process, where the material leaves the same at B, is an interrupted process for making the sugar in the form in which it is commercially marketed.

The specific procedure includes the withdrawing of the starch bearing material at A and combining it with the sugar liquor withdrawn at B, in a suitable vessel or mixer. The customary temperature of the combined materials in usual practice gives the satisfactory mixing temperature of 130° F., but it should be understood that this temperature is not critical. It may be less or it may be increased so long as it is maintained below a temperature that would affect the starch so as to retard the crystallizaion of the sugar.

In a broader aspect, starch materials other than that obtained from corn and of various moisture content may be added to the sugar liquor leaving the sugar conversion process at B before the liquor is cooled and before crystallization thereof. The composite sugar mixture containing the suspended starch bearing component is then cooled and seeded in the usual manner in vessel 18 and then run into suitable containers represented by pan 19 where crystallization is completed, producing a product of stable solid form.

The sugar component of the mixture prevents deterioration of the starch component. By taking advantage of this property, mixtures of this nature may, if desired, be air dried to moistures comparable to that of refined grits.

In order to illustrate the practice of the process and the resulting material produced, the following formulas and analyses are given:

To 100 pounds of starch bearing material withdrawn at A and having a moisture of 45%, is added 300 pounds of sugar syrup at approximately 10% moisture withdrawn at B, and the composite material thoroughly mixed at a temperature of approximately 130° F. After the material has been cooled and crystallized, an analysis of 100 pounds of the resulting product will show initially the following:

| Water | Dry substance starch | Dry substance sugar |
|---|---|---|
| Pounds 17.8 | Pounds 12.2 | Pounds 70.0 |

To 100 pounds of starch bearing material having a moisture of 35%, is added 200 pounds of sugar syrup of 10% moisture withdrawn at B, and the composite material thoroughly mixed at a temperature of approximately 130° F. After the material has been cooled and crystallized an analysis of 100 pounds of the resulting product will show initially the following:

| Water | Dry substance starch | Dry substance sugar |
|---|---|---|
| Pounds 18.0 | Pounds 21.0 | Pounds 61.0 |

To 100 pounds of starch bearing material having a moisture of 35%, is added 60 pounds of sugar syrup of 10% moisture withdrawn at B, and the composite material thoroughly mixed at a temperature of 130° F. After the material has been cooled and crystallized an analysis of 100 pounds of the resulting product will show initially the following:

| Water | Dry substance starch | Dry substance sugar |
|---|---|---|
| Pounds 25.0 | Pounds 39.0 | Pounds 36.0 |

It will be understood that the mixing formulas are given merely by way of example and not as limitations.

What is claimed and desired to be secured by Letters Patent is:

1. The process of making a composition of matter which consists in mixing with a crystallizable sugar liquor from a process of hydrolyzing starch to sugar, before the liquor has been cooled and crystallized, a quantity of water-containing starch bearing material, cooling and seeding the composite mixture to cause crystallization into a solid stable mass by taking up of the water from the starch in the crystallization of the sugar liquor.

2. The process of making a composition of matter which consists in hot mixing a quantity of undried starch bearing material from a corn wet milling process to form refined grits, with a quantity of sugar liquor from a starch hydrolyzing process to form sugar, and then cooling and crystallizing the mixture, said components being combined in such ratio that the sugar liquor will, in crystallizing, take up by inclusion the water from the starch bearing material, as water of crystallization, to produce a mechanically dry product.

3. The process of producing a starch derivative product, which consists in hydrolyzing starch to form a sugar liquor, refining and evaporating same to approximately 10% moisture content, then mixing therewith a quantity of wet starch bearing material at a temperature of approximately 130° F., then cooling the mixture and seeding it to effect crystallization, forming the same in a solid mass, by inclusion of water from the wet starch bearing material in the sugar crystals.

4. The process of making a composition of matter, which consists in withdrawing from a process for manufacturing corn into refined grits, the grits while wet and before artificial drying thereof, withdrawing from a process of manufacturing starch into sugar, a sugar liquor before the same is cooled and crystallized, which sugar liquor has the power to absorb water, mixing the two materials under their combined heat, then cooling and crystallizing the same, to cause the sugar liquor to absorb the water from the grits thereby forming the same into stable solid bodies.

5. The process of making a product of starch derivation that is stable and suitable for use as a malt adjunct, which comprises progressing the treatment of starch bearing cereal to a wet end product prior to artificial drying, and progressing a hydrolysis process to form an uncrystallized sugar liquor of a relatively low moisture content, then combining the first-named product with the said last-named product and crystallizing them together in such proportion that the water of crystallization and occluded water of the crystals will reduce the moisture content of the first-named product to stabilize the same so as to prevent fermentation and molding thereof.

6. The process of making a mechanically dry starch material, consisting of taking wet starch bearing material, mixing the same with a crystallizable sugar liquor having the property of including water, in crystallizing, as water of crystallization and occluded water, crystallizing the mixture to cause the sugar liquor to crystallize and to take up as its included water the water in the wet starch whereby to preserve the same, and to produce a mass bonded into lump form.

7. The process of making a mechanically dry starch material, consisting of taking a wet starch bearing material, adding thereto a crystallizable sugar material having the capacity to absorb water into a water of crystallization, and crystallizing the materials as mixed, the sugar material being so proportioned relative to the starch bearing material as to absorb the water thereof and to render the resulting product mechanically dry.

8. The process of making mechanically dry starch material, consisting in mixing a wet starch bearing material with a crystallizable sugar liquor having the capacity to absorb water by water of crystallization, in the manner obtained by the following: 100 lbs. of starchy material having approximately 45% moisture, and 300 lbs. of sugar liquor having approximately 10% moisture, mixed at approximately 130° F., and crystallized, to produce a mechanically dry end product.

9. The process of making mechanically dry starch material, consisting in mixing a quantity of wet starch bearing material obtained from a process of making starch before drying, at from approximately 45% to 35% moisture content, with approximately from 300 lbs. to 60 lbs. of crystallizable sugar liquor at approximately 10% moisture, the substances being heated above crystallization at their mixing, and when thus mixed, cooling the mass to crystallize it and cause the sugar liquor, in crystallizing, to take up by inclusion of the water from the starch bearing material.

10. A starch concrete including starch, water, and crystallizable dextrose, the dextrose being present in proportion at least as great as twenty five percent of the amount of starch, by weight, the water being present as water of crystallization and occluded water, the materials being bonded together into a frangible but substantially dust-proof concrete.

WALTER R. FETZER.